United States Patent Office 3,327,621
Patented June 27, 1967

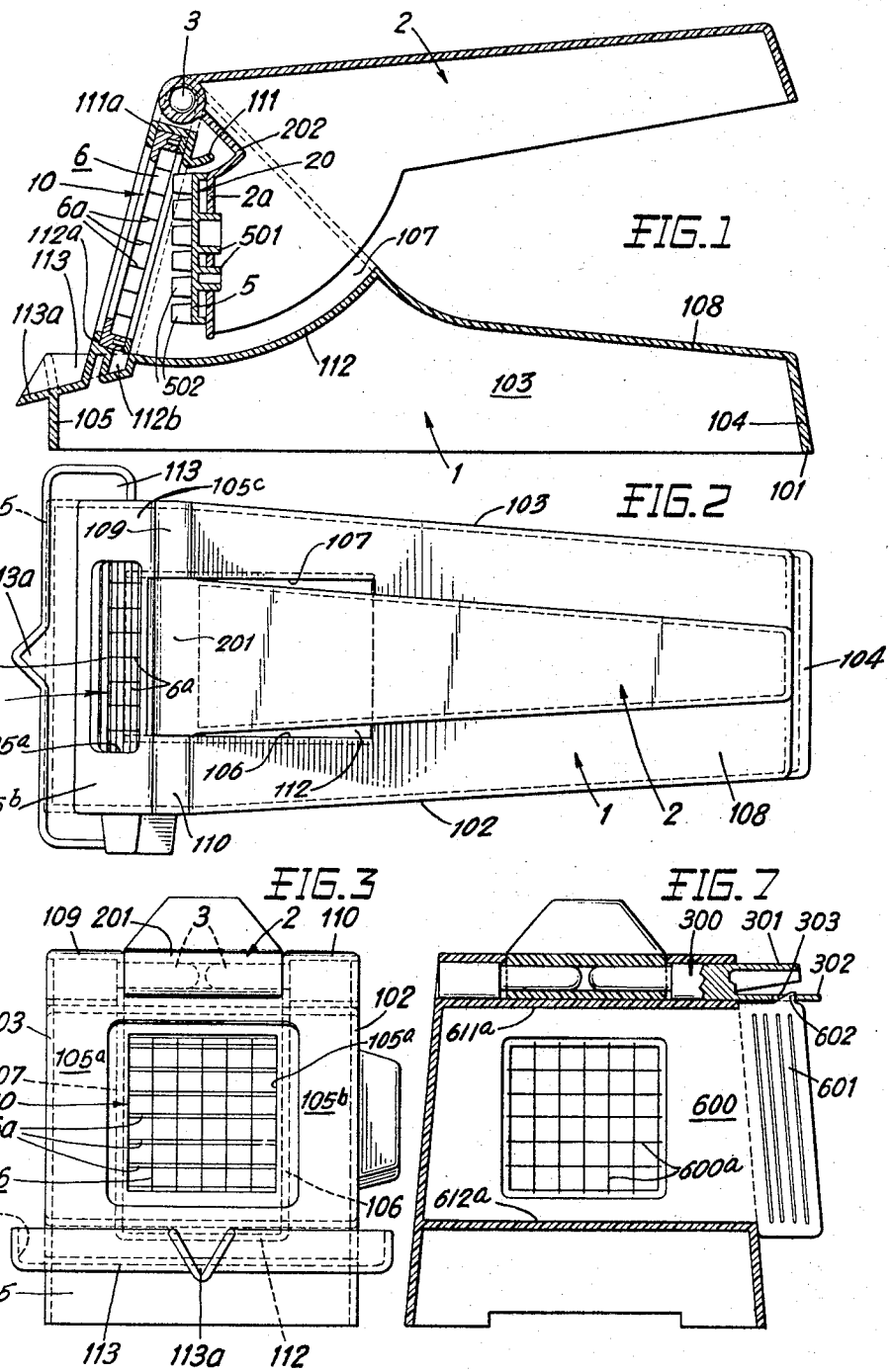

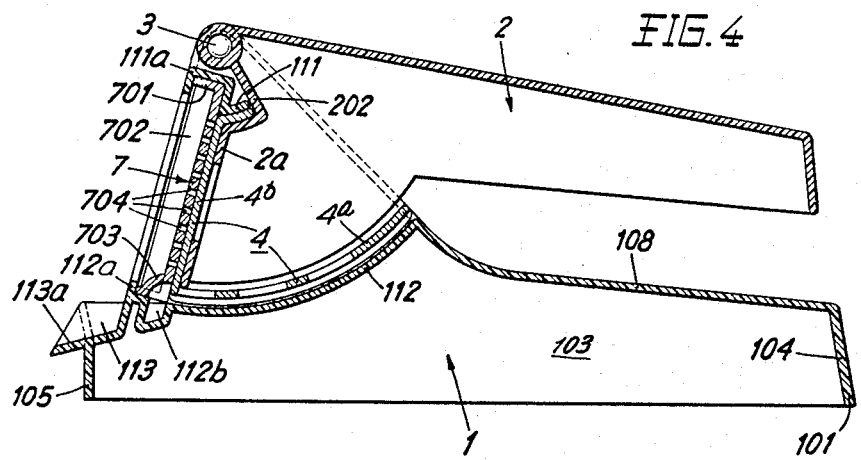
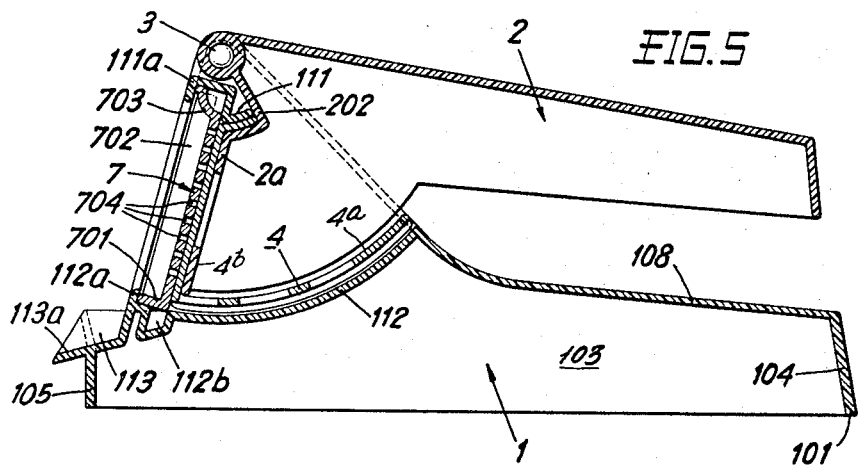
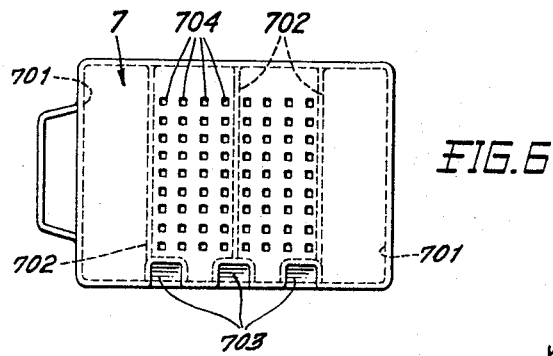

3,327,621
PRESSURE-TYPE JUICER
Karl Zyssef, Hauptstrasse 31, Lyss, Switzerland
Filed Aug. 23, 1965, Ser. No. 481,515
Claims priority, application Switzerland, Aug. 31, 1964, 11,368/64
4 Claims. (Cl. 100—125)

The present invention relates to culinary apparatus and more particularly to culinary apparatus comprising a pressure-type juicer or juice extractor having a plurality of inserts and insets which may be selectively placed in the apparatus for preparing food stuffs such as vegetables, juices and the like.

Pressure-type juice extractors having variable inserts so that they may dice potatoes, mash them or juice various fruits and vegetables are well known in the culinary art. However, for the most part the well known pressure-type juicers are expensive and are usually found only in commercial establishments such as restaurants. In addition, as most pressure-type juicers are utilized in commercial enterprises where visual appearance is not a prime requisite, their aesthetic appearance leaves something to be desired.

In view of the above, it is a principal object of the present invention to provide a juicer in which inserts and insets of variable types may be positioned in order to prepare vegetables and fruit juices.

Another object of the present invention is to provide a pressure-type juicer which may be utilized in the home and in which the housewife may handle in a simple and effective manner.

Another object of the present invention is to provide a pressure-type juicer wherein the more important parts are suited for less expensive manufacture, for example from plastic or the like.

Still another object of the present invention is to provide a novel pressure-type juicer combining the aforementioned features in an aesthetically appearing body in order to enhance the marketability of the juicer while accomplishing the same at less expense than as has heretofore been possible.

Other objects and a fuller understanding of the invention may be had by referring to the following description and claims taken in conjunction with the accompanying drawings in which:

FIG. 1 is a longitudinal sectional view through a juicer constructed in accordance with the present invention, and in the present instance adapted for cutting potatoes or the like into small rods;

FIG. 2 is a plan view of the juicer illustrated in FIG. 1, and as if the juicer were not in sections;

FIG. 3 is a front elevational view of the juicer illustrated in FIG. 2;

FIGS. 4 and 5 are longitudinal sectional views similar to the view of the juicer shown in FIG. 1, and illustrating the positioning of an inset and insert for mashing potatoes, peas and the like and as a juice extractor respectively;

FIG. 6 illustrates the inset utilized in the juicer shown in FIGS. 4 and 5; and

FIG. 7 is a fragmentary sectional view illustrating a modified embodiment of a juicer constructed in accordance with the present invention.

Referring now to the drawings, and especially FIGS. 1 and 2 thereof, a juicer comprising a molded or cast body portion 1 having a base 101, is illustrated therein. As shown in the drawings, spaced upstanding and oppositely disposed tranverse walls 104 and 105 forming rear and front walls respectively, are connected by spaced upstanding longitudinally extending side walls 102 and 103, which walls are connected at their upper portion by a gently and upwardly sloping top wall 108 which joins the transverse wall 105 at the upper portion thereof. As shown the front wall includes laterally spaced extensions 105b and 105c having spaced and tranversely aligned bearing mounting means, in the present instance bearing eyes 109 and 110 at the extended terminus of the extensions. (See FIG. 3) As best illustrated in FIGS. 1-3, the top wall 108 is provided with a break constituting in the present instance a press bowl having an arcuate bottom wall 112 and upstanding longitudinal side walls 106 and 107 respectively joining the extensions 105b and 105c respectively, connecting the top wall 108 thereto and forming the sides of the press bowl. For reasons which will become more evident hereinafter, the curve of the arcuate bottom wall 112 is defined by striking an arc from the center located through the bearing eyes 109 and 110.

In accordance with the feature of the invention a lever or handle 2, having a bearing eye 201 for receiving axle or pivot pins 3 mounted in the bearing eyes 109 and 110, has a downwardly projecting platen 2a for swinging movement in the press bowl. The platen 2a is provided with means for mounting thereon insert means 20. In the present instance, the insert means 20 cooperate with inset means 10, which inset means are fittable in laterally extending, vertically spaced U-shaped guides 111a and 112a. As illustrated in FIG. 1, the U-shaped guide 111a has an inward longitudinal extension 111 which serves as a partial top wall for the press bowl and which is fittable in an indented portion 202 located in the platen 2a.

Between the lower inset guide 112a and the arcuate bottom wall 112 is first juice collecting means, in the present instance a groove 112b, which at its transverse terminal ends opens into a second juice collecting groove 113. As illustrated in FIGS. 2 and 3, the juice collecting groove 113 extends exteriorly of the transverse or front wall 105 and is provided with a juice discharge spout 113a.

To increase the strength, durability and thus the pressure which may be applied to the molded handle 2 by the user, while simultaneously providing a modicum of shielding in the event of juices or the like being thrown rearwardly out of the press bowl, the press lever or handle 2 is made U-shaped in cross section, the legs of the U being tapered rearwardly so that they clear the top wall 108 when the inset means 10 are engaged by the insert means 20.

In accordance with another feature of the invention, and as has been heretofore set forth, various insert means 20 may be connected to the platen 2a to operate in conjunction with cooperating insert means 10 mounted in the guides 111a and 112a respectively, to perform various culinary operations upon vegetables and the like. For example, in the embodiment illustrated in FIG. 1, the platen 2a is provided with a plurality of openings to receive holding pins 501 associated with an insert 5 having forwardly facing discharge pins 502. The discharge pins 502 are so arranged as to fit between knives 6a of an inset 6 whereby upon placing a vegetable in the press bowl, and exerting clockwise or downward pressure upon the handle 2, the discharge pins 502 cause, in conjunction with the knives 6a, a cutting-up of the vegetable and its discharge through an opening 105a in the transverse wall 105. For example, if the vegetable placed between the insert and the inset is a potato, the cooperation of the knives 6a and discharge pins 502 causes the potato to be cut-up into small rods.

Other insets and inserts may also be positioned for cooperation in the guides and platen. For example, as shown in FIG. 4 an insert 4 may comprise an arcuate member 4a closely fitting the bottom wall 112 of the press bowl, and having an upstanding portion 4b for connection to the platen 2a. In the present instance the upstanding portion 4b of the insert 4 may be a flat sheet for squeezing vegetables and the like against insets 10.

When using the juicer as a masher or juice extractor, an inset 7, such as illustrated in FIG. 6, may be positioned in the guides 111a and 112a in such a manner as to permit, when in one position, a squeezing or mashing operation, and when in another position juice extraction. As illustrated in FIG. 6, in the present instance the inset 7 comprises a rectangular plate having a flange portion 701 circumscribing the plate, reinforcements 702, recesses 703 forming channels on one longitudinal edge of the plate, and a plurality of perforations 704 through which the pressurized material is squeezed.

When the inset 7 is to be used for juice extraction, it is inserted so that the recesses 703 are positioned adjacent the first juice collecting groove 112b so that juice may thereby flow into the collecting groove 113 and out the spout 113a. Alternatively, when the inset 7 is to be used for mashing, its position is reversed as shown in FIG. 5, whereby the recesses 703 are located adjacent the longitudinal extension 111 thus closing off the first juice collecting groove 112b. In this manner, the vegetable pressurized between the insert 4 and the inset 7 can only pass through the holes 704 of the inset and out the opening 105a and thereby be removed from the juicer.

To afford locking and at the same time facilitate quick removal of the insets, if such is desired, one of the pivot pins may be of the form illustrated in FIG. 7. As illustrated, a pivot pin 300 has a modified terminal portion which comprises an arcuate and rigid extension 301 vertically spaced from a resilient biasing catch extension 302 having an opening 303 therein. In the illustrated embodiment, it is preferable to provide on the inset means, in the present instance and for purposes of illustration an inset 600 similar to the inset 6, a handle 601 having catch means thereon. In the present instance the catch means comprises a tooth 602 on the upper portion of the handle and engageable with the opening 303 in the resilient extension 302. Thus, when the inset 600 containing cutting knives 600a is inserted in the guides 611a and 612a, the tooth 602 engages the opening 303 upon the inset reaching the working position. When it is desired to remove the inset 600, resilient extension 302 merely has to be bent upwardly so as to disengage the tooth 602 and permit removal of the inset. Of course an inset of the character of the inset 7 as well as any other desired inset may be provided with such catch means to permit quick insertion and removal thereof, depending upon the operation to be performed upon the particular vegetable, fruit, or other foodstuff.

Thus the present invention provides a simple and effective pressure-type juicer, well suited for less expensive manufacture as for example by press molding plastic or the like, and having an aesthetically appearing body and easily mountable and demountable inserts and insets for performing varying operations upon foodstuffs. In addition, the pressure-type juicer of the present invention permits the housewife to handle the same in a simple and effective manner and at a lower economic cost.

Although the invention has been described with a certain degree of particularity, it is understood that the present disclosure has been made only by way of example and that numerous changes in the details of construction and the combination and arrangement of parts may be made without departing from the spirit and the scope of the invention as hereinafter claimed.

What is claimed is:

1. A manually operable pressure-type juicer comprising a body including a base, said base having spaced upstanding and oppositely disposed transverse and longitudinal walls, said transverse walls forming front and rear walls and said longitudinal walls forming side walls of said base, a top wall joining said transverse and longitudinal walls, said front wall including laterally spaced, upstanding extensions and having at the extended end thereof bearing means; a press bowl including an arcuate bottom wall in said top wall, laterally spaced upstanding longitudinal side walls joining said extensions, connecting said top wall thereto and forming the sides of said press bowl, a handle pivotally mounted on said bearing means and having a downwardly projecting platen thereon swingable in an arc in said press bowl substantially the same as the arc of said bottom wall, said handle having a U-shaped cross section; laterally extending, vertically spaced U-shaped guides in said front wall for the receipt of an inset means and means on said platen for receipt of an insert means, said guides aligned to permit registration of said inset means and said insert means for operation upon vegetables inserted in said press bowl between said platen and said front wall, and wherein at least said body and said handle is composed of a plastic.

2. A juicer as set forth in claim 1 including an inward and laterally extending longitudinally extending projecting extension adjacent the upper of said guides to form a partial top wall for said press bowl.

3. A juicer as set forth in claim 1 including a first juice collecting groove in said arcuate bottom wall adjacent said lower of said guides and running transversely of said body, and a second juice collecting groove mounted externally of said body and communicative with said first juice collecting groove.

4. A juicer as set forth in claim 1, including a first juice-collecting groove in said arcuate bottom wall extending transversely across the entire width of the body, said first groove being open at its two ends, and a second juice-collecting groove communicating with said open ends extending outside of the body side walls along the front wall and along at least a portion of the body's side walls adjacent said front wall, said second groove being provided with a discharge spout.

References Cited

UNITED STATES PATENTS 2,518,650  8/1950  Van Dusen _____ 100—98
2,789,496  4/1957  Turner _____ 100—234 X
2,906,195  9/1959  Zysset _____ 100—125

FOREIGN PATENTS 963,395  7/1964  Great Britain.

BILLY J. WILHITE, *Primary Examiner.*